US010503880B2

(12) United States Patent
Walsh et al.

(10) Patent No.: US 10,503,880 B2
(45) Date of Patent: Dec. 10, 2019

(54) METHOD AND APPARATUS FOR LIMITING ACCESS TO DATA BY PROCESS OR COMPUTER FUNCTION WITH STATELESS ENCRYPTION

(71) Applicant: Pulselocker, Inc., San Francisco, CA (US)

(72) Inventors: Ryan D. Walsh, San Francisco, CA (US); Michael P. Snyder, San Francisco, CA (US)

(*) Notice: Subject to any disclaimer, the term of this patent is extended or adjusted under 35 U.S.C. 154(b) by 0 days.

(21) Appl. No.: 15/671,339

(22) Filed: Aug. 8, 2017

(65) Prior Publication Data
US 2017/0357786 A1   Dec. 14, 2017

Related U.S. Application Data

(63) Continuation of application No. 13/773,600, filed on Feb. 21, 2013, now Pat. No. 9,727,708.

(60) Provisional application No. 61/601,491, filed on Feb. 21, 2012, provisional application No. 61/699,297, filed on Sep. 11, 2012.

(51) Int. Cl.
*G06F 21/00* (2013.01)
*G06F 21/12* (2013.01)
*G06F 21/10* (2013.01)
*H04L 29/06* (2006.01)
*G06F 21/62* (2013.01)

(52) U.S. Cl.
CPC ............. *G06F 21/12* (2013.01); *G06F 21/10* (2013.01); *G06F 21/6218* (2013.01); *H04L 63/101* (2013.01); *H04L 63/102* (2013.01); *G06F 2221/2141* (2013.01); *H04L 2463/101* (2013.01)

(58) Field of Classification Search
CPC ...................................................... G06F 21/12
USPC .......................................................... 713/189
See application file for complete search history.

(56) References Cited

U.S. PATENT DOCUMENTS

| 7,779,097 | B2 | 8/2010 | Lamkin et al. |
| 7,885,404 | B2 * | 2/2011 | Park ..................... H04L 9/0637 380/28 |
| 13,813,238 | | 8/2014 | So et al. |
| 9,240,945 | B2 | 1/2016 | Kumar et al. |
| | | (Continued) | |

FOREIGN PATENT DOCUMENTS

EP   2280524 A2   2/2011
WO   02101494 A2   12/2002

OTHER PUBLICATIONS

PCT International Search Report and Written Opinion of the International Searching Authority issued in International Application No. PCT/US2013/027198, dated Jul. 18, 2013 (17 pages).

*Primary Examiner* — Longbit Chai
(74) *Attorney, Agent, or Firm* — Miller Nash Graham & Dunn LLP

(57) ABSTRACT

Systems and methods related to DRM content usage mechanisms for both online and offline usage of content are disclosed, including systems providing secure access to data regardless of network state or connectivity state to the networked access control mechanism. An access control mechanism having a secondary offline access control mechanism is presented, further including multiple implementations for data encapsulation, as well as providing a method for writes to files and to the filesystem itself by externally created applications with no API or modification to their operation.

14 Claims, 6 Drawing Sheets

(56) References Cited

U.S. PATENT DOCUMENTS

| | | |
|---|---|---|
| 2007/0156726 A1 | 7/2007 | Levy |
| 2008/0077807 A1* | 3/2008 | Hicks .................... G06F 21/57 |
| | | 713/193 |
| 2010/0057563 A1 | 3/2010 | Rauber et al. |
| 2011/0213971 A1 | 9/2011 | Gurel et al. |

* cited by examiner

METHOD AND APPARATUS FOR LIMITING ACCESS TO DATA BY PROCESS OR COMPUTER FUNCTION WITH STATELESS ENCRYPTION

CROSS-REFERENCE TO RELATED APPLICATIONS

This application claims priority to and is a continuation of co-pending U.S. Non-Provisional application Ser. No. 13/773,600, entitled METHOD AND APPARATUS FOR LIMITING ACCESS TO DATA BY PROCESS OR COMPUTER FUNCTION WITH STATELESS ENCRYPTION, filed Feb. 21, 2013, which claims benefit from U.S. Provisional Application No. 61/699,297, entitled METHOD AND APPARATUS FOR LIMITING ACCESS TO DATA BY PROCESS OR COMPUTER FUNCTION WITH STATELESS ENCRYPTION, filed Sep. 11, 2012, and U.S. Provisional Application No. 61/601,491, entitled METHOD AND APPARATUS FOR LIMITING ACCESS TO DATA BY PROCESS OR COMPUTER FUNCTION, filed Feb. 21, 2012, the contents of all of which are incorporated by reference herein.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD OF THE INVENTION

The following invention relates generally to online and offline content usage, and more particularly to systems and methods related to DRM content usage mechanisms.

BACKGROUND OF THE INVENTION

Within consumer computer and network applications there is an inherent lack of interoperability in the form of an open interface to arbitrate file access beyond standard filesystem permissions and related attributes. If a developer desired to deliver information to a process or peripheral securely, there are few readily available options, short of partnering with peripheral or process developers for application program interface (API) options. This is cumbersome to implement and often results in limited access for the user.

Custom filesystems have been developed to implement digital rights management (DRM) processes in a transparent fashion, freeing application developers from the burden of creating and exposing an API for secure content delivery. However, some of these filesystems are designed to require a persistent connection to the Internet; certain system calls (open( ), close( ), read( ), write( )) will "call home" (a verification via connection) to validate file privileges in real time, because they were designed for cellular devices.

One U.S. patent application (US2011/0213971) discloses several generic implementations that require a persistent network connection for cellular devices. However, a network connection is sometimes unavailable when access to the data is a necessity. Furthermore, application US2011/0213971 utilizes access control binding for requests, requiring significant overhead.

Herein, new inventions and new improvements upon prior art are presented with the explicit use of providing secure access to data regardless of network state or connectivity state to the networked access control mechanism. We present improvements to the particulars of the access control mechanism, particularly by adding a secondary offline access control mechanism, presenting multiple implementations for data encapsulation, as well as providing a method for writes to files and to the filesystem itself by externally created applications with no API or modification to their operation.

BRIEF SUMMARY OF THE INVENTION

The present invention provides a filesystem that arbitrates access to a secure data storage based on process identification and DRM engine while also implementing a method for allowing for both encryption and non-sequential non-contiguous writes. The secure data storage may be implemented as a path in another filesystem, virtual or native, or as a database. The filesystem or file-containing database encrypts the data before writing to the secure data storage and decrypts the data before delivering it to the requesting application. For performance in media streaming and subscription services, these encrypt/decrypt techniques may include the use of file buffering, file streaming, Random Access Memory, or any combination thereof.

The present invention also provides a data content manager to populate the secure data storage. This may take the form of a subscription based music, media, or shopping application. The filesystem identifies this process and validates the application binary before allowing access to read from or write to the filesystem. A DRM handler controls access to the filesystem. This DRM handler handles all states of network connectivity with a license, uniquely providing read and write access to the filesystem, as opposed to the just the files themselves, in an offline mode. Built-in latency allows for offline access of data. If access control is desired to be controlled remotely, the DRM may be configured to periodically require an online connection.

Consumer applications may be identified, hashed, and looked up against a whitelist in order to determine what processes may properly consume or otherwise exploit this data, which provides for a non-file-bound access control method.

An aspect of the present invention is a method including the steps of receiving a request from a requester to access a protected file, folder, or network resource; determining a context of the requestor, the context comprising process ID number, parent process name, parent process ID, filesystem/disk or network location, actual binary executable, hash binary executable, or, a combination thereof; verifying access rights associated with the requestor; determining access rights associated with the protected file, folder, or network resource; and providing read, write, or execute access to the requested file, folder or network resource based on the context of the requestor.

In one mode of this aspect, the method further includes decrypting the protected file based on the context of the requestor. In another mode of this aspect, the method further includes transferring decrypted content from the protected file to the requestor. In yet another mode of this aspect, the verifying step includes the steps of identifying an accessing process having file contents and using a hash algorithm on the accessing process file contents. This mode may also include the step of validating the process against a whitelist using a hash function or a hash table lookup.

In another mode of this aspect, the verifying step is performed within a computer operating system, a device driver, or an executable program. In this mode, the computer operating system, device driver, or executable program may be hardware-based, software-based, or a combination thereof.

In another mode of this aspect, the protected file, folder, or network resource may be part of a virtual filesystem. In still another mode of this aspect, the protected file may be a data file, an executable file, or a combination thereof. Another mode of this aspect further includes the steps of storing decrypted content of the protected file in a buffer and providing access to the buffer in response to the request.

Another mode of this aspect includes using a database to manage access to raw data located in a local storage medium. A further mode of this aspect includes the additional steps of dynamically creating access rights credentials and using the access rights credentials in the verifying step. A still further mode of this aspect includes the steps of creating access rights credentials, using the access rights credentials in the verifying step, using the access rights credential in an process external to the verifying step, and storing the access rights credentials in a shared data structure. In this mode, the shared data structure may be a hash table. This mode may include the additional steps of determining whether the verifying step using the access rights credentials has failed, and returning an error status.

Another mode of s aspect includes the step of periodically requiring a localhost to create a connection with an online or offline access control system. This mode includes the further step of using the connection to validate an access control parameter, and the access control parameter may be an account buffing status. This mode may include the step of defining a time period to allow offline access to the protected file, folder, or network resource based on a latency of the periodic connection with an online or offline access control system.

Another aspect of the present invention is an apparatus, comprising at least one processor or driver and at least one memory including computer program code, the memory and the computer program code configured to, with the at least one processor or driver either externally or directly connected to the memory, cause the apparatus to perform a method, the method comprising receiving a request from a requestor to access a protected file, folder, or network resource; determining a context of the requestor, the context comprising process ID number, parent process name, parent process ID, filesystem/disk or network location, actual binary executable, hash of binary executable, or a combination thereof; verifying access rights associated with the requestor; determining access rights associated with the protected file, folder, or network resource; and providing read, write, or execute access to the requested file, folder, or network resource based on the context of the requestor.

Further aspects of the invention will be brought out in the following portions of the specification, in which the detailed description is for the purpose of fully disclosing preferred embodiments of the invention without placing limitations thereon.

DETAILED DESCRIPTION OF THE INVENTION

Referring more specifically to the drawings, for illustrative purposes the present invention is embodied in the system and method generally shown in FIGS. 1 through 6. The system may vary as to configuration and as to details of the parts, and the method may vary as to the specific steps and sequence, without departing from the basic concepts as disclosed herein.

In the development of any actual implementation of the present invention, as in any engineering or design project, numerous implementation-specific decisions must be made to achieve the developers' specific goals, such as compliance with system, legal and business related constraints, which may vary from one implementation to another. Moreover, it should be appreciated that such development efforts might be complex and time consuming, but would nevertheless be a routine undertaking of design, fabrication and manufacture for those of ordinary skill in the art having the benefit of this disclosure.

Figure 1:
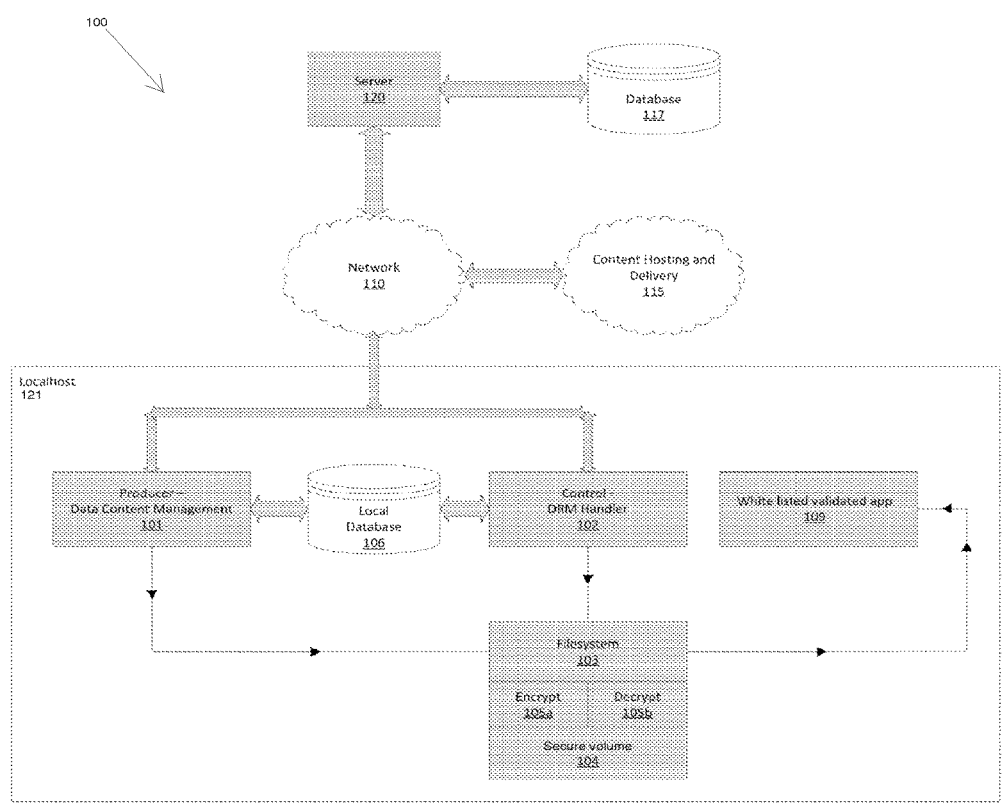
FIG. 1 depicts an example system according to an embodiment of the present invention.

FIG. 1 illustrates en embodiment of the system 100 of the present invention, including the manner in which different processes may interact with the filesystem. The system described in 100 may be used for the application of distributing subscription content to multiple applications on Localhost 121 in an online or offline mode. When a user installs the software bundle, the bundle typically includes a combination of Data Content Management Application 101, DRM Handler 102, Local Database 106, Filesystem 103, encryption 105*a*, decryption 105*b*, and approved applications 109. Upon installation of the software bundle, a folder, which may be a hidden folder, is created to contain application data, such as Local Database 106. This data may be encrypted music, other media, accounting information, or display content such as html and/or javascript used to display information in Data Content Management application 101.

Our system may be instantiated in an online mode, though this is only required to receive data from a network to place in the filesystem. Content and data may initially be received from the network to Localhost 121. Within Localhost 121 is a Data Content Management Application 101 with Local Content Database 106. Data Content Management Application 101 requests data, such as music and other media, from Server 120 via Network 110, such as the Internet. Server 120 distributes the media sending a command to the Content Hosting and Delivery service 115, which delivers to Data Content Management Application 101. The successful execution of the distribution command delivery by Server 120 is dependent on a valid subscription or other access control paradigm. In parallel to the distribution command delivery, the Server 120 updates the DRM handler application 102 with accurate access control and subscription information for use it the case of disconnection of the Localhost 121 from network 110.

The Data Content Management Application 101 is responsible for populating the secure volume (secure data storage) 104 with data from the Content Hosting and Delivery service 115, typically as a content distribution cloud. This data, which is typically raw data, may be stored in RAM, in other folders, in Local Database 106, in any manner or means of internal or external storage (such as, but not limited to, flash drives, hard drives, cloud storage, other optical or magnetic media, etc.), or any combination of these. Typically, the raw data may be stored on "local storage media", whether that storage media is internal or external, and this term may include cloud drives or local LAN volumes. This data may be music or other media, which may be encrypted in order to deny accessibility to certain users and applications. As stated previously, Local database 106 may also contain accounting information to track data selection and downloads.

If a user wishes to access a media file using the service described herein with a whitelisted and validated applications 109 the user selects or acknowledges the file(s) to be shared in Data Content Management application 101. Data Content Management application 101 adds the media to secure volume (secure data storage) 104 and updates the relevant information in both local database 106 and remote database if appropriate. DRM handler 102 arbitrates access to Filesystem 103 by providing non-file-bound access control credentials to applications via whitelist and access control and subscription information. DRM handler 102 does not control access to particular data or media files; the files are accounted for and tracked as part of providing access control to filesystem 103. Data Content Management application 101 maintains a record of media accessible in the Filesystem 103.

The Data Content Management application 101 populates the data in the secure volume (secure data storage) 104 via the filesystem 103. Applications of this type typically have read and write access in order to copy, move, or validate existing files and add new files. The Data Content Management application 101 also handles the mounting and unmounting of the filesystem 103, syncing the content, and invoking DRM handler 102. It may be efficient, but not necessary, to place DRM handler 102 within the same application as Data Content Management application 101. In either implementation, DRM handler 102 is the logical manager of access control.

In a subscription media service model, this system, upon registering for an account, processes users billing information to make a payment, then, provides subscription-based access to the data 115. This specific information allows the DRM handier 102 to arbitrate access to the secure data to approved applications 109.

When either Data Content Management 101 or a whitelisted application 109 requests access to files in filesystem 103, the filesystem checks the application binary and its context for credentials for access. Upon successful validation, which may include communication with DRM Handler 102, encryption 105*a* or decryption 105*b* is executed to grant access to secure volume (secure data storage) 104 containing the media files.

This filesystem 103 primarily implements the following access controls: arbitrating access to a secure volume (secure data storage) 104 by identifying and validating processes that use the filesystem 103, and securing data storage by encrypting writes 105*a* to the storage and/or decrypting reads 105*b* from the storage. Encryption 105*a* or decryption 105*b* may be implemented using an algorithm such as the Advanced Encryption Standard or any other modern, secure data obfuscation method.

Figure 2:
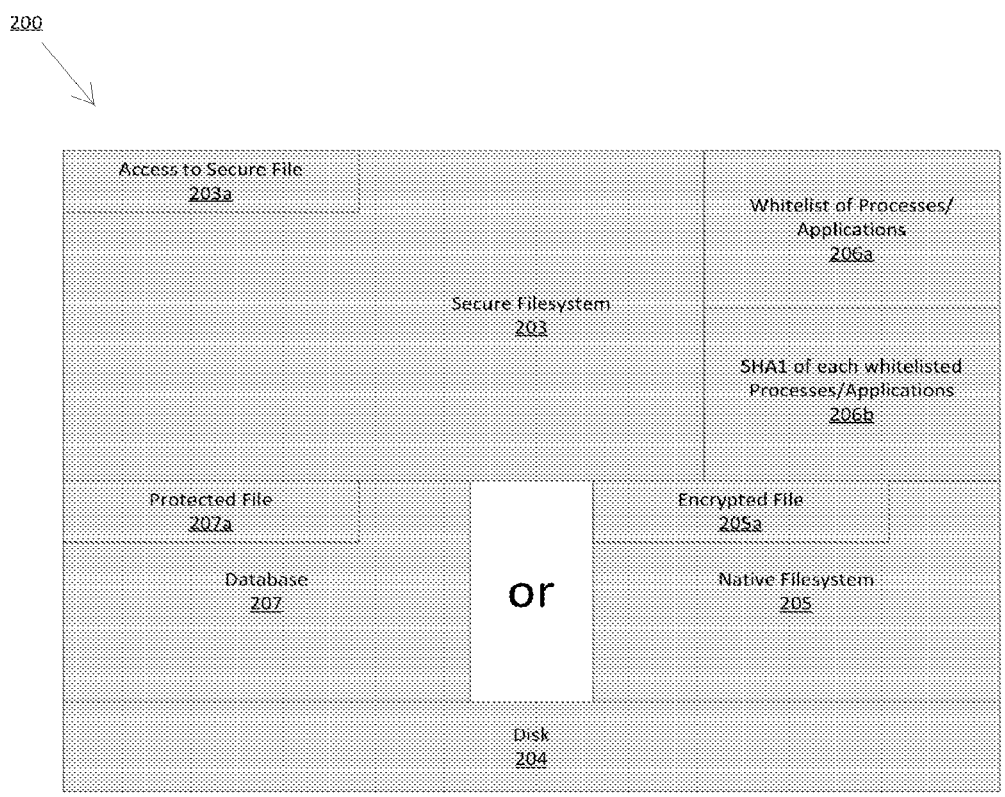
FIG. 2 depicts example filesystem hierarchies according to an embodiment of the present invention.

Example Filesystem Abstraction 200, shown in FIG. 2, shows an embodiment of a filesystem according to the present invention. FIG. 2 illustrates how such an example filesystem may be designed to execute this method. In the diagram, Secure Filesystem 203 may be implemented with any combination of (but not limited to) the following: a custom filesystem with hooks into the OS kernel, a Callback FS or Dokan volume (Windows), FUSE volume (*nix, OSX), that can be mounted without root or superuser privileges, or a combination of these technologies instantiated in a database form.

The Filesystem 203 grants access to files, such as encrypted files 205*a* or protected files 207*a* though a process-level access control mechanism. A process or application may be identified by looking at the context of the accessor of the filesystem 203 (the "requestor"). There are several options for determining a process or application's context.

In our modified and improved instantiation of a FUSE-like filesystem, the context is retrieved with getContext( ) and contains the user identification (UID), group identification (GID), process identification (PID) and more. However, in our modified and improved instantiation of a Callback FS-like filesystem, the PID is obtained directly by using GetOriginatorProcessId( ) and GetOriginatorProcessName( ). These system calls are not ubiquitous, and special consideration is taken for each supported platform.

The PID is the moot relevant piece of data, as this can be used to identify the path of the executable corresponding to this process ID. Using sysctl, or similar, to query the kernel, the response string contains the fully qualified path name of the process trying to access the filesystem.

A further measure of application validation happens when the hash algorithm output 206*b* of the application path of the calling process ("accessing process") is matched against a whitelist of approved application signatures 206*a*. An error code may be returned when a non-whitelisted application tries to access the secure volume.

Low-level file access implementation selection is non trivia particularly in our example use case of a subscription media service. Several approaches are presented for low-level file access implementation, as we will use a hybrid implementation within the system, based on the needs of access. The system described herein may be optimized for performance, and the use of a hybrid approach may be necessary to account for different types of data sets being shared between applications.

A database 207 may be used to grant access to files housed in a relational structure with lookup tables or in a NoSQL-like map/reduce and stream. Using a database 207 requires maintenance in the form of upgrades, patches, vulnerability and threat management, licenses, etc. The database contents, if encrypted, introduce equal latency for the cryptography as the filesystem, in addition to the overhead of the database operating layer. With a subscription media service, the database operating layer can significantly decrease performance on the localhost when using large file types, such as lengthy WAV and AIFF music files or HD movie clips. 'File locking' data in a database is possible, allowing mutually exclusive access to the data but can also introduce difficulty when allowing professional media management applications, such as music production, digital audio workstations, and professional DJ applications, to access files. Some of these applications use unique file access methods, such as the Serato DJ application's encoding of information within mp3 files. Serato utilizes non-sequential non-contiguous writes to the file. A database method may not be compatible with these applications, and our intention is to present a fully compatible, API-independent, transparent sharing of files between applications.

One approach that may be implemented is the use of a filesystem 205. Filesystem 205 requires only appropriate drivers for the operating system with considerably less maintenance. This filesystem 205 and supporting code for various operating systems has been created according to the present invention, allowing for utilization of a custom, protected filesystem to limit access by calling application ("requestor"), yet maintaining the original functionality of the calling application. A database may have a faster lookup for a large flat dataset, but with proper organization and or smaller datasets, the filesystem will be faster and more transparent. Also, using a filesystem, executing true file locking with flock( ) or a semaphore is possible. There is no unnecessary overhead between the data doing locked and the accessor.

We will focus on the filesystem methods because they are most appropriate for our example cases of subscription media services, digital audio workstations, multimedia players, and music mixing and editing applications.

Furthermore, our improvements unique methods are not limited to implementation in externally controlled applications. The calling application, which may be a third-party application, intending to access the protected files may be integrated with the system of the present invention. For example, a media mixing application such as Serato's Scratch LIVE or Native Instruments Traktor may contain an implementation of a filesystem such as this to provide in-app media services. A use case for this type of integration of our work would be the providing of subscription media content within an application in online or offline mode while maintaining separate services, such as providing a premium media service such as hulu plus portable video game console device.

In prior art, performance issues have been introduced in the form of latency of the encryption algorithm. For some algorithms, hardware acceleration is available. For example, AES encryption is used, some modern microprocessor CPUs (such as those offered by INTEL Corporation) have AES implemented in hardware ((AES_NI). This hardware is optimized to offload these CPU intensive calculations, improving both latency and main CPU cycles involved in the codec. Trying to read from the filesystem 205 will result in reading encrypted data 205a. Data is obfuscated unless it is accessed through the novel filesystem 203. With the nature of the encryption cipher block chaining, non-sequential non-contiguous writes to the filesystem will result in corrupted data. As stated, professional media management applications, such as music production, digital audio workstations, and professional DJ applications, require unique file access methods, such as the Serato DJ application's encoding of information within mp3 files. This makes the use of cipher block chaining inefficient if not ineffective, and we have created a filesystem to verify this case.

The DRM handler presented herein may implement addition detection methods to guard against vulnerability, such as logging and reporting behavior to the Content Hosting and Delivery service 115 dependent on the system goals.

The non-file-bound, whitelisted application approach of the present invention significantly reduces overhead, and its combination with hybrid selection of low-level file access implementation provides direct improvement to the prior art in access and performance.

Figure 3:
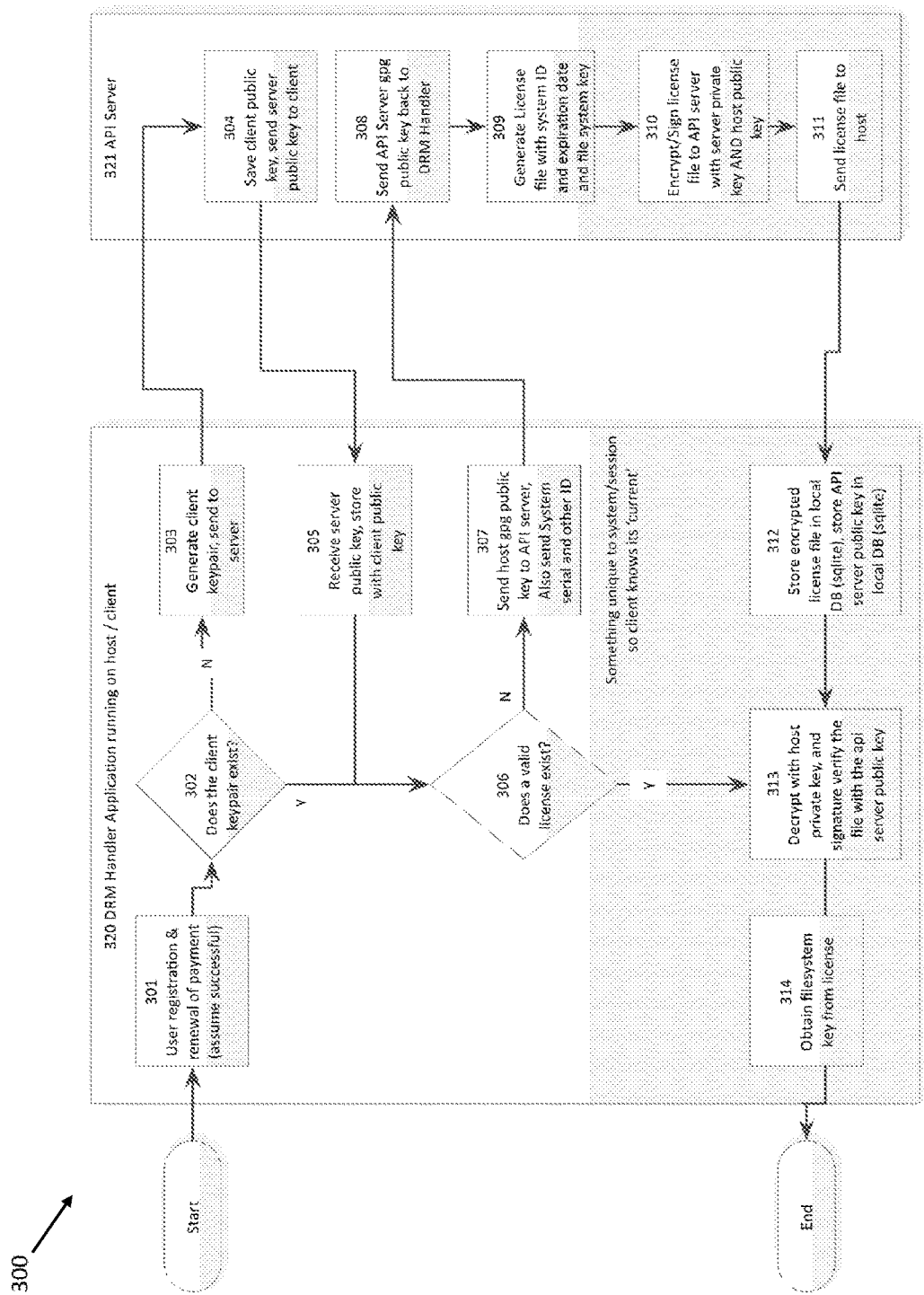
FIG. 3 is a flowchart of an embodiment of the Generation and Reception of License Information aspect of the present invention.

The filesystem of the present invention is capable of work in an and offline mode; an example key generation and exchange is diagrammed in FIG. 3, in which Generation/Reception of License information 300 uses well-established key exchange protocols. The integration of the filesystem key step 309 is an improvement that may be made to enable controlled access to the client's filesystem 103 from a remote service via providing as license.

Referring to FIG. 3, the process of Generation/Reception of License Information 300 may have two components, a DRM Handler Application 320 running on the host or client and an API Server 321. These components exchange data to optimize the creation and maintenance of licenses in the present system.

At the outset, a user may register and submit payment 301. The system queries whether the client keypair exists at 302; if the client keypair exists, the system determines whether a valid license exists at 306. If a valid license exists, the data may be decrypted at 313 with the host's private key and signature verified with the API servers public key. A filesystem key may then be obtained from the license at 314.

If the client keypair does not exist at 302, a client keypair may be generated at 303 and sent to the API Server 321. In the API server 341, a client public key may be saved and a server public key may be sent to the client at 304. The server public key may be received by the DRM Handler process 320 and stored with the client public key at 305, at which point a query may be made at 306 to determine if a valid license exists. If a valid license exists, the data may be decrypted at 313 with the host's private key and signature verified with the API server's public key. A filesystem key may then be obtained from the license at 314.

If a valid license does not exist at 306, the host public key may be sent to the API server 321, along with other information, such as the System serial or other identifying information, at 307. The embodiment shown in FIG. 3 utilizes a gpg public key, but it will be understood by one of ordinary skill in the art that any public key system may be utilized. The identifying information may be anything considered unique to the system or session such that the client knows that the system or session is "current". Within the API server 321, a server public key may be sent back to the DRM Handler 321 at 308. A license file may then be created, typically utilizing system ID, expiration date, and file system key, at 309. The license file may then be encrypted or signed to the API server, typically with the server private key and host public key at 310. The license file may be sent to the host at 311. Returning to the DRM Handler 320, the encrypted license file may be stored in a local database, and the API Server public key may be stored in a local database at 312. Once the valid license file exists, the data may be decrypted at 313 with the host's private key and signature verified with the API server's public key. A filesystem key may then be obtained from the license at 314.

Figure 4:
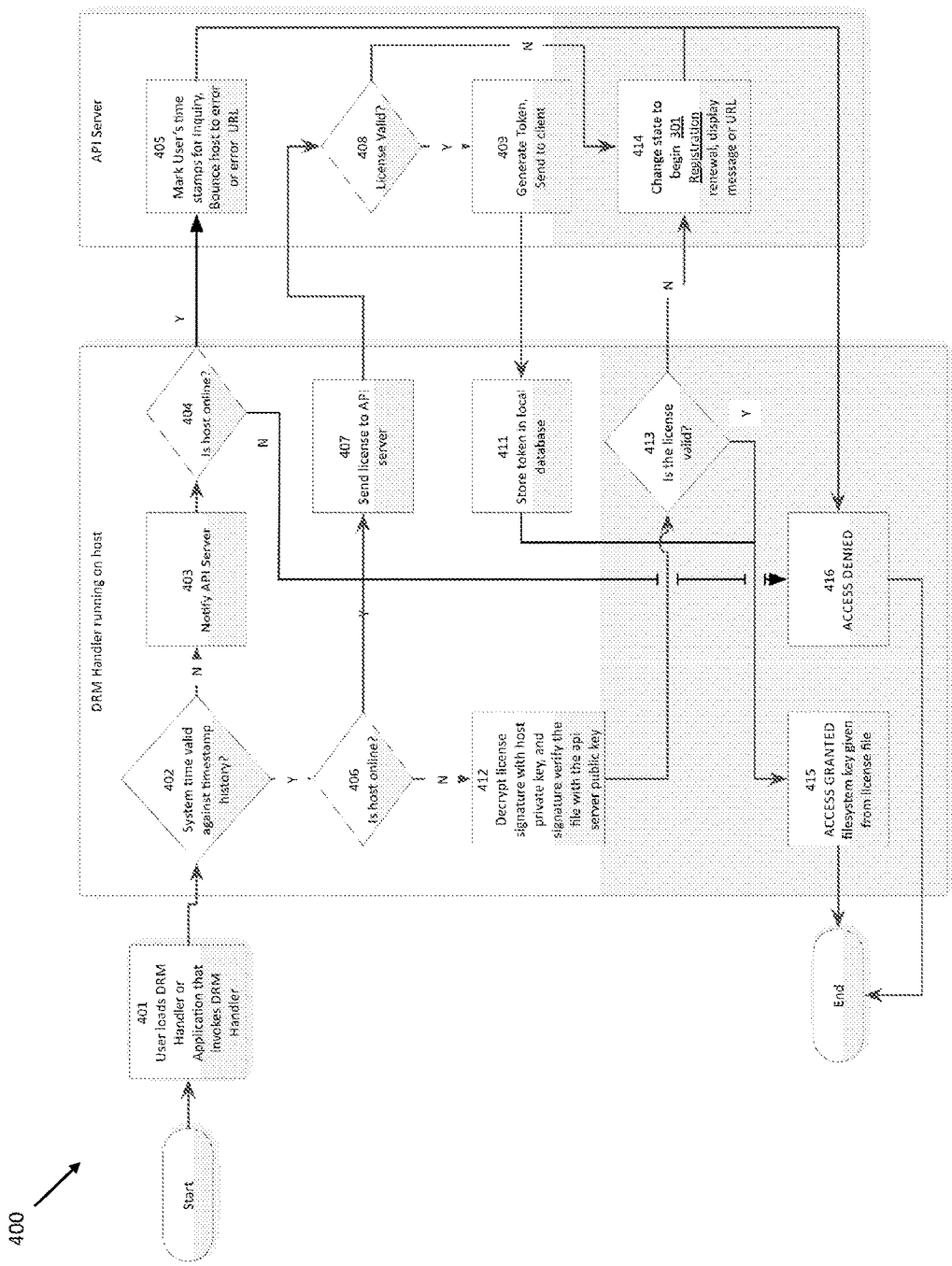
FIG. 4 is a flowchart of an embodiment of the Validation of License for Filesystem Access aspect of the present invention.
Figure 5:
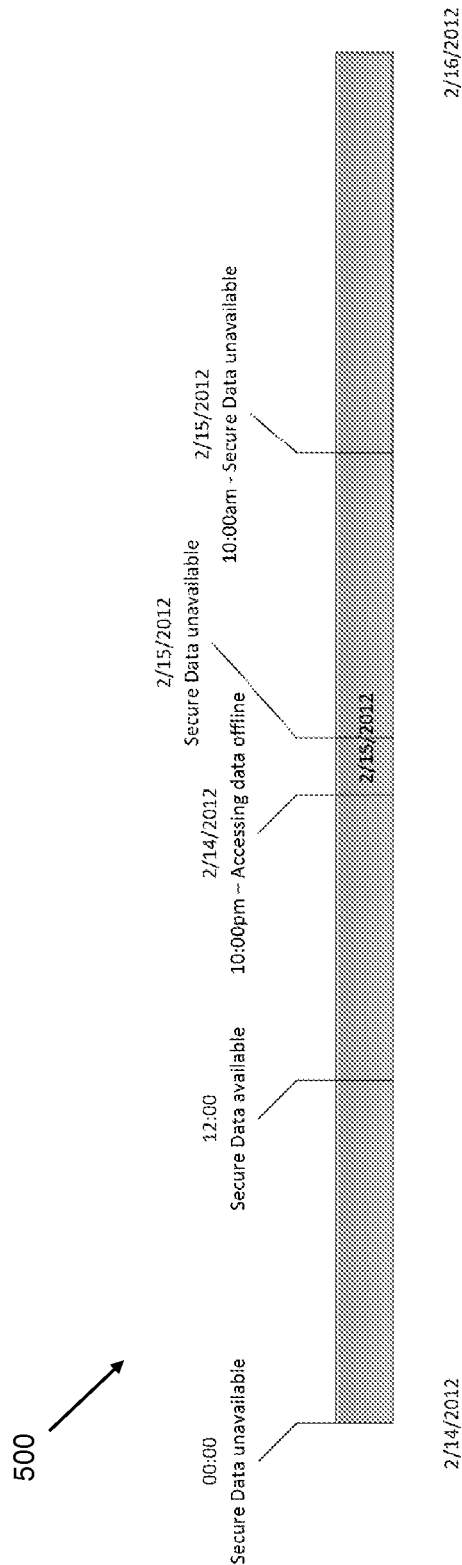
FIG. 5 shows an example timeline of DRM offline access according to an embodiment of the present invention.

The timing for an example Time Based DRM License and its expiration is illustrated in FIGS. 4 and 5, though associating the DRM engine of the present invention with a time-based expiration is not mandatory. Example of Validation of License for Filesystem Access 400 demonstrates how the license created in Example of Generation/Reception of License information 300 is validated. The validation of the filesystem key in an offline mode described in 412 to 413 is an essential part of the method.

License validation process 400 may begin at 401 when a user loads the DRM Handler or an application that invokes the DRM handler. The DRM Handler may determine whether the system time is valid, typically comparing against a timestamp history, at 402. If the system time is not valid, the API Server may be notified at 403 and a check may be made to determine if the host is online at 404. If the host is not online, access to the filesystem may be denied at 416, and the process ends.

If the host is online at 404, the user s timestamps may be marked and noted. The user's state may then be changed to registration/renewal (Box 301 in FIG. 3) at 414, access to the file system is denied at 416, and the process ends.

If the system time check at 402 is valid a check to see is the host is online may be made at 406. If the host is online at 406, the license may be sent to the API server at 407, where a check may be made to determine if the license is valid at 408. If the license is not valid at 408, the user's state may then be changed to registration/renewal (Box 301 in FIG. 3) at 414, access to the file system is denied at 416, and the process ends.

If the license is valid at 408, a token may be generated and sent to the client at 409. Within the DRM the token may be stored in a local database at 411, and access may e granted at 415, in which the filesystem key is given from the license file, and the process ends.

If the host is not online at 406, the license signature may be decrypted with the host private key and the file may be signature verified the API server public key at 412. A query may be made to determine if the license is valid at 413. If the license is valid at 413, access may be granted at 415, in which the filesystem key is given from the license file, and the process ends. If the license is not valid at 413, the user's state may then be changed to registration/renewal (Box 301 in FIG. 3) at 414, access to the file system is denied at 416, and the process ends.

As used in the instant application, the terms "access control parameter" and "access control credential" are not identical. The access control parameter may be relevant in offline and online modes. In a offline mode, the license may be the access control parameter, while in an online mode, a valid login and server side license check may be the access control parameter. This term typically refers to having a valid subscription that is not expired. A check of this condition may include account billing status, locations (if geoblocking is an issue, for example), account billing status, or any combination of these types of data. Validation of access control parameters may also include, for example, tracking login times to detect if someone changed their system time to 'revalidate' their licenses. Access control credentials may include users, passwords, tokens, or similar validation schemes. For example, the instant invention includes, but is not limited to, credentials in the form of the whitelist of allowed processes, when the files are actually opened, closed, read, or written.

License validity may be dependent on a time component. System time tampering becomes a concern when using a time-based DRM. To support using time as a validity metric, any potential tampering with the system clock may be detected. The DRM engine 102 securely logs times and dates of engine invocations, and will deny access to secure data if the time starts rolling backwards in users' attempts to exploit DRM time limits.

FIG. 5 depicts an example case 500. The timeline starts at midnight, where the secure data is unavailable due to a user not invoking a DRM engine in the last 12 hours. At noon, the user launches the DRM engine and the secure data becomes available for the next 12 hours. The user then accesses the secure data while offline at 10 pm, Access is provided until midnight, at which point access is denied until the next time the DRM engine is invoked while the user is online.

Prior Art depends on a "call home" (a verification via connection) EVERY time you try to open and use a secure file. This introduces a substantial performance liability in the form of network latency, and does not make sense for use in a non-cellular or persistently connected device. Cellular service costs, outages or unavailability further complicate matters. In this case, access to the secure data is limited or not even available.

After completing the processes described herein, Data Content Management Application 101 allows for secure and managed access of data, such as music or other med a in an offline or online mode, to any application on Localhost 121.

As a result of cipher block chaining's ineffectiveness in the DJ application case, we have developed the filesystem to be uniquely robust to this type of action, by building a stateless mode of encryption that allows for random access.

To understand, we present an example implementation using Advanced Encryption Standard (AES) encryption. When using AES based encryption, we have created a stateless version of the 'countermode' (CTR) method, which uses a deterministic function counter) to counteract the disadvantages of weaker random access capable block cipher modes, such as the electronic codebook (ECB).

Cipher feedback (CFB) will also work for random access as well, but when using this mode blocks i and i-1 are needed to decrypt block i. CTR only needs block i to decrypt block i.

When using CTR the will be no need to store the complete files in memory, so either mode is acceptable. There are other methods to accomplish this task.

However, there is a problem with common CTR implementations: the state (the counter) is kept sequentially, creating data integrity and efficiency issues with our example cases of subscription media services, digital audio workstations, multimedia players and music mixing and editing applications.

NIST has acknowledged the following disadvantage to CTR: "In the usual way to use CTR mode, the sender is stateful. But in the proper use of a mode like CBC, the sender is also stateful. That is because the IV is either maintained from the last block enciphered, or it is a pseudorandom value, and the usual implementation of a pseudorandom value requires the maintenance of state"(http://csrc.nist.gov/groups/ST/toolkit/BCM/douments/proposedmodes/cir/ctr-spec.pdf).

To satisfy our example use case, we have created a novel stateless AES CTR implementation, sufficiently detailed herein for one of ordinary skill in the art in AES, CTR, and ECB. In order to be truly stateless, the read/write address (offset) is translated algebraically to a counter value. Furthermore, the write buffer is fragmented to accommodate the counter's need to count and seed each 16-byte (128 bit) block.

'Counting' in this implementation is achieved through the following algebraic process:

The base block number must be calculated. This is the counter's starting value.

$$\text{base block number} = \frac{\text{address}}{\text{blocksize}}$$

The number of books to write is calculated similarly with the requested read/write size.

$$\text{number of blocks} = \frac{\text{size}}{\text{blocksize}}$$

With those two calculations compete, the stateless AES CTR has the ability to loop through the blocks to read or write (decrypt or encrypt).

Figure 6:
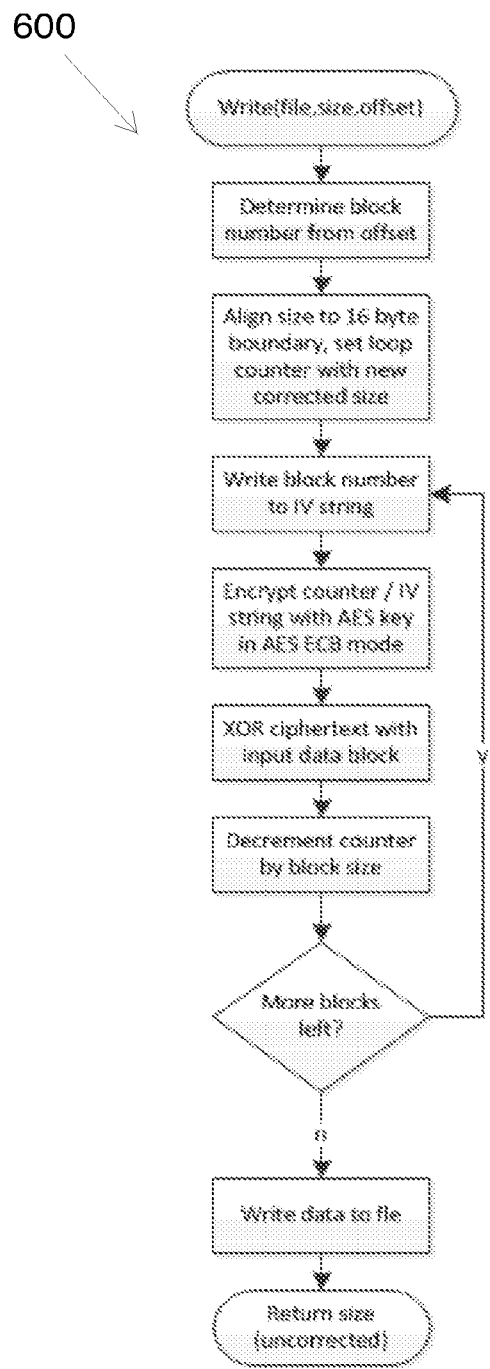
FIG. 6 shows an example algorithm for implementing a write( ) in a custom cryptography aspect of the present invention.

FIG. 6 shows an Algorithm 600 for implementing a write using our custom CTR mode and details the process of using the base block number and number of blocks equations noted above.

This use allows for significant advantage with subscription-based content and media services, as sharing media and other secured information between applications in an offline mode is possible and provides the user a greater level of access to subscribed content. There are many other applications beyond subscription based content and media services that could benefit from such a method of distributing data. We have identified externally created, publicly available consumer applications such as subscription media services, digital audio workstations, multimedia players, and music mixing and editing applications in which normal operation would not be possible without a unique method of handling writing to the files and filesystem.

Our intention is to present a fully compatible, API-independent, transparent, and secure sharing of files between applications. The example system described herein uses a custom DRM system that is application access control based. Furthermore, it is our intention to allow some external applications to write to the files and filesystem described herein as to create a persistent experience across clients for consumer applications such as subscription media services, digital audio workstations, multimedia players, and music mixing and editing applications.

In summary, what is disclosed and described in the foregoing is a transparent DRM implementation in which applications may access secure content, without knowledge or understanding of the DRM engine itself, which is implemented in the filesystem. This access is available while online or offline. Trying to access the data without proper validation by the filesystem results in access denial and in worst case, encrypted data access, which is useless to the intruder.

Although the description above contains many details, these should not be construed as limiting the scope of the invention but as merely providing illustrations of some of the presently preferred embodiment this invention. Therefore, the scope of the present invention fully encompasses other embodiments which may become obvious to those skilled in the art, and that the scope of the present invention is accordingly to be limited by nothing other than the appended claims, in which reference to element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method for stateless encryption or decryption of files associated with a content management system, comprising:
   determining, for a string of data, a base block number based on a read/write address and a block size;
   setting a start value of a counter based on the base block number and the block size translated from the read/write address;
   determining a number of blocks to encrypt or decrypt based on a size of read/write data;
   determining a count value of the counter based on the base block number and the number of blocks to encrypt or decrypt;
   writing a block number of a first block to an initialization vector (IV) string;
   encrypting or decrypting the IV string with an encryption key to generate ciphertext;
   logically combining the ciphertext with the first block; and
   decrementing the count value of the counter by the block size and repeatedly performing the logically combining steps until a loop count is exhausted to provide the stateless encryption or decryption of files associated with the content management system.

2. The method of claim 1, wherein the base block number is determined by dividing the block address by the block size.

3. The method of claim 1, wherein the number of blocks is determined by dividing a read/write size by the block size.

4. The method of claim 1, wherein the block size is 16 bytes.

5. The method of claim 1, further comprising, for each block in the number of blocks, writing the block number for a respective block to the IV string, encrypting or decrypting the IV string with the encryption key to generate the ciphertext; logically combining the ciphertext with the respective block, and decrementing the counter by the block size until the counter is zero.

6. The method of claim 5, further comprising writing the logically combined ciphertext with each block to a file.

7. The method of claim 1, wherein the ciphertext is logically combined with the first block by an exclusive OR logical combination.

8. A computer-readable storage device for stateless encryption or decryption of files associated with a content management system having instructions stored thereon that, when executed by a processor, cause the processor to:
   translate a read/write address to a start value of a counter based on a block size and a base block number;
   determine a number of blocks to encrypt or decrypt based on a size of read/write data;
   determine a count value of the counter based on the base block number and the number of blocks to encrypt or decrypt;
   write a block number of a first block to an initialization vector (IV) string;
   encrypt or decrypt the IV string with an encryption key to generate ciphertext;

logically combine the ciphertext with the first block; and decrement the count value of the counter by the block size and repeatedly performing the logically combining steps until a loop count is exhausted to provide the stateless encryption or decryption of files associated with the content management system.

9. The computer-readable storage device of claim 8, wherein the read/write address is algebraically translated to the counter value by dividing the read/write address by a block size.

10. The computer-readable storage device of claim 8, wherein the number of blocks is determined by dividing a read/write size by a block size.

11. The computer-readable storage device of claim 10, wherein the block size is 16 bytes.

12. The computer-readable storage device of claim 8, further comprising instructions stored thereon that, when executed by the processor, cause the processor to, for each block in the number of blocks, write the block number for a respective block to the IV string, encrypt or decrypt the IV string with the encryption key to generate the ciphertext; logically combine the ciphertext with the respective block, and decrement the counter until the counter is zero.

13. The computer-readable storage device of claim 12, further comprising instructions stored thereon that, when executed by the processor, cause the processor to write the logically combined ciphertext with each block to a file.

14. The computer-readable storage device of claim 8, wherein the ciphertext is logically combined with the first block by an exclusive OR logical combination.

\* \* \* \* \*